US005769110A

United States Patent [19]

Ohmi et al.

[11] Patent Number: 5,769,110

[45] Date of Patent: Jun. 23, 1998

[54] FLUID CONTROL APPARATUS

[75] Inventors: Tadahiro Ohmi, Sendai; Keiji Hirao, Osaka; Michio Yamaji, Osaka; Shigeru Itoi, Osaka; Tsutomu Shinohara, Osaka; Nobukazu Ikeda, Osaka; Hiroshi Morokoshi, Osaka; Tetsuya Kojima, Osaka, all of Japan

[73] Assignee: Fujikin Incorporated, Osaka, Japan

[21] Appl. No.: 672,668

[22] Filed: Jun. 28, 1996

[30] Foreign Application Priority Data

Jun. 30, 1995 [JP] Japan .................................... 7-164902

[51] Int. Cl.$^{6}$ ...................................................... F16K 11/22

[52] U.S. Cl. ........................... 137/269; 137/271; 137/884

[58] Field of Search .................................... 137/271, 884, 137/269

[56] References Cited

U.S. PATENT DOCUMENTS

| | | | |
|---|---|---|---|
| 4,657,048 | 4/1987 | Foster | 137/884 |
| 4,714,091 | 12/1987 | Wagner | 137/271 X |
| 5,603,601 | 2/1997 | Winkelströter | 137/271 X |

*Primary Examiner*—Kevin Lee
*Attorney, Agent, or Firm*—Armstrong, Westerman, Hattori, McLeland & Naughton

[57] ABSTRACT

A fluid control apparatus comprises a mass flow controller, two on-off valves disposed at the inlet side of the controller and three on-off valves disposed at the outlet side of the controller. At the inlet side, a main fluid on-off valve is positioned on a purge fluid on-off valve, and at the outlet side, a vent on-off valve is positioned on a vacuum suction on-off valve, with a main passage on-off valve further positioned on the vent on-off valve.

2 Claims, 5 Drawing Sheets

FLUID CONTROL APPARATUS

BACKGROUND OF THE INVENTION

The present invention relates to fluid control apparatus for use in equipment for fabricating semiconductors and other systems.

Fluid control apparatus are already known which have a regulator for regulating a flow rate or pressure, and a valve device disposed on at least one of the inlet side and the outlet side of the regulator and comprising a plurality of valves for selectively causing one of a plurality of fluid channels to communicate with the fluid channel of the regulator upon a change-over.

FIGS. 5 and 6 show a conventional fluid control apparatus, and FIG. 7 shows two conventional fluid control apparatus as arranged side by side and connected to each other. In the following description, the terms “front,” “rear,” “right” and “left” are used with respect to the direction of flow of fluids; the right-hand side of FIG. 5 will be referred to as “front,” the left-hand side thereof as “rear,” the rear side of plane of the drawing as “left” and the front side thereof as “right.” The terms “upper” and “lower” are used based on FIG. 5.

With reference to FIGS. 5 and 6, the illustrated conventional flow control apparatus 101 comprises a mass flow controller (regulator) 102, and on-off valves 103, 104 and on-off valves 105, 106, 107 arranged respectively on the inlet side (rear side) and the outlet side (front side) of the controller. The apparatus has five on-off valves 103 to 107. Arranged at the inlet side are two valves, i.e., a main fluid on-off valve 103 connected directly to the mass flow controller 102, and a purge fluid on-off valve 104 connected directly to the right side of the valve 103. Arranged at the outlet side are three valves, i.e., a main passage on-off valve 105 connected directly to the controller 102, a vent on-off valve 106 connected directly to the right side of the valve 105, and a vacuum suction on-off valve 107 connected directly to the right side of the valve 105.

The main fluid on-off valve 103, which is used for opening and closing an inlet channel of process gas, comprises a rectangular parallelepipedal body 108 having a rearwardly open inlet channel 131, a forwardly open outlet channel 132 and a bypass channel 133 communicating with the outlet channel 132 and rightwardly opened, and an actuator 109 for opening and closing the inlet channel 131. The open end of the inlet channel 131 has an internally threaded portion 110 for connecting a sleeve.

The purge fluid on-off valve 104, which serves to open and close an inlet channel for a purge gas, comprises a rectangular parallelepipedal body 111 having a rearwardly open inlet channel 134 and an outlet channel 135 communicating with the bypass channel 133 of the main fluid on-off valve 103, and an actuator 112 for opening and closing the inlet channel 134. The open end of the inlet channel 134 has an internally threaded portion 113 for connecting a sleeve.

The main passage on-off valve 105, which serves to open and close a channel extending to a process chamber, comprises a rectangular parallelepipedal body 114 having a rearwardly open inlet channel 136, a forwardly open outlet channel 137 and a bypass channel 138 rightwardly open and communicating with the inlet channel 136, and an actuator 115 for opening and closing the inlet channel 136. The open end of the outlet channel 137 has an internally threaded portion 116.

The vent on-off valve 106, which is adapted to open and close an outlet channel for the purge gas, comprises a forwardly open outlet channel 140, a leftwardly open inlet channel 139 and communicating with the bypass channel 138 of the main passage on-off valve 105, and a rightwardly open bypass channel 141 communicating with the inlet channel 139, and an actuator 118 for opening and closing the inlet channel 139. The open end of the outlet channel 140 has an internally threaded portion 119 for connecting a sleeve.

The vacuum suction on-off valve 107, which serves to open and close a flow channel in communication with a vacuum pump, comprises a rectangular parallelepipedal body 120 having a forwardly open outlet channel 143 and a leftwardly open inlet channel 142 in communication with the bypass channel 141 of the vent on-off valve 106, and an actuator 121 for opening and closing the inlet channel 142. The open end of the outlet channel 143 has an internally threaded portion 122 for connecting a sleeve.

The main fluid on-off valve 103 and the purge fluid on-off valve 104 are connected together with screws 128 driven in from the right side. The main passage on-off valve 105, the vent on-off valve 106 and the vacuum suction on-off valve 107 are connected together with screws 128 driven in from the left side. Seal portions 127 are provided between the on-off valves 103, 104 adjacent to each other, and between the valves 105, 106, 107 adjacent to one another, as arranged side by side.

Thus, the fluid control apparatus has an inlet valve device provided at the inlet side of the regulator 102 and comprising the two on-off valves 103, 104 for selectively causing one of the inlet channels 131, 134 to communicate with the inlet channel of the regulator 102 upon a change-over, and an outlet valve device disposed at the outlet side of the regulator and comprising the three on-off valve 105, 106, 107 for selectively causing one of the outlet channels 137, 140, 143 to communicate with the outlet channel of the regulator 102 upon a change-over, such that a fluid flowing into one of the inlet channels 131, 134 at the inlet side of the fluid control apparatus 101 is passed through the regulator 102 and caused to flow out of one of the outlet channels 137, 140, 143 at the outlet side of the apparatus.

In the case where two fluid control apparatus 101 are installed, these apparatus are arranged side by side (i.e., at right and left) as seen in FIG. 7, and corresponding valves of the adjacent apparatus 101 are connected together by means of joints and tubes. Thus connected to each other are the purge fluid on-off valves 104, the main passage on-off valves 105, the vent on-off valves 106, and the vacuum suction on-off valves 107. Incidentally, the main fluid on-off valves 103, 103 of the respective control apparatus 101, 101 are not connected to each other. The valves 103, 103 have respective sleeves (cylindrical joint members) 151, 153 joined to their internally threaded portions 110, 110, and process gas supply tubes 179, 180 are individually joined to these sleeves 151, 153.

The purge fluid on-off valves 104 are connected together in the following manner. A sleeve 152 is joined to the internally threaded portion 113 of the valve 104 of the control apparatus 101 at left. The sleeve 152 has joined thereto a first L-fitting 165, to which a second L-fitting 166 is joined. A sleeve 154 is joined to the internally threaded portion 113 of the valve 104 of the control apparatus 101 at right, and has joined thereto a T-fitting 161 having one end joined to a purge gas supply tube 181. A third L-fitting 167 is joined to this T-fitting 161. The second L-fitting 166 is connected to the third L-fitting 167 by a tube 182. The second and third L-fittings 166, 167 are used to avoid the interference of the connecting tube 182 with the process gas supply tube 180 at right.

The main passage on-off valves 105 are connected together in the following manner. A sleeve 155 is joined to the internally threaded portion 116 of the valve 105 of the control apparatus 101 at left. A first tube 183 extending longitudinally of the apparatus (i.e., front-rear direction) is joined to this sleeve 155. An L-fitting 168 is joined to the first tube 183. A sleeve 158 is joined to the internally threaded portion 116 of the valve 105 of the control apparatus 101 at right. A second tube 186 extending longitudinally of the apparatus is joined to this sleeve 158. Joined to the second tube 186 is the rear end of a T-fitting 162, the left end of which is connected to the L-fitting 168 by a third tube 184 extending laterally (i.e., in the right-left direction). A sleeve-joining internally threaded member 192 is connected to the right end of the T-fitting 162 by a laterally extending fourth tube 185. The first and second tubes 183 and 186 serve to avoid interference with other piping. The fourth tube 185 is provided for adjusting this line to the lateral length of other piping.

The vent on-off valves 106 are connected together in the manner to be described below. A sleeve 156 is joined to the internally threaded portion 119 of the valve 106 of the control apparatus 101 at left. A first L-fitting 169 is joined to the sleeve 156, and has joined thereto a second L-fitting 170. A third L-fitting 171 is further joined to this fitting 170. A sleeve 159 is joined to the internally threaded portion 119 of the valve 106 of the control apparatus 101 at tight., A fourth L-fitting 175 is joined to this sleeve 159, and has joined thereto a fifth L-fitting 176. A T-fitting 163 is further joined to the fifth L-fitting 176. The third L-fitting 171 is connected to the left end of the T-fitting 163 by a laterally extending first tube 187. A sleeve-joining internally threaded member 193 is connected to the right end of the T-joint 163 by a laterally extending second tube 188. The first, second, fourth and fifth L-fittings 169, 170, 175 and 176 serve to avoid interference with other piping, while the second tube 188 is used to adjust the length of the line to other piping.

The vacuum suction on-off valves 107 are connected together in the manner to be described below. A sleeve 157 is joined to the internally threaded portion 122 of the valve 107 of the control apparatus 101 at left. A first L-fitting 172 is joined to this sleeve 157. A second L-fitting 173 is connected to the first L-fitting 172 by a vertically extending first tube 189. A third L-fitting 174 is further joined to this fitting 173. A sleeve 160 is joined to the internally threaded portion 122 of the valve 107 of the control apparatus 101 at right. A fourth L-fitting 177 is joined to this sleeve 160. A fifth L-fitting 178 is connected to the fourth fitting 177 by a vertically extending second tube 190, and has joined thereto a T-fitting 164. The third L-fitting 174 is connected to the left end of the T-fitting 164 by a laterally extending tube 191. A sleeve-joining internally threaded portion 194 is directly joined to the right end of the T-fitting 164. The first, second, fourth and fifth L-fittings 172, 173, 177 and 178, and the first and second tubes 189, 190 are provided for avoiding interference with other piping.

When the two fluid control apparatus 101 are thus arranged side by side, the lateral width of the arrangement is the combined width of six valves, and the longitudinal length of the arrangement is the distance from the tube 182 interconnecting the purge fluid on-off valves 104 to the third and fourth tubes 184, 185 for interconnecting the main passage on-off valves 105.

Many fittings and tubes are used in the arrangement of the conventional apparatus to avoid interference between piping portions or to match the lateral length of one piping portion with that of another piping portion. Such an increase in the number of parts increases the number of welds and entails a higher cost, further increasing the overall size of the assembly and the number of fluid trapping or retaining portions (increased dead volume) which lower the purity of the process gas for use in producing semiconductors. The increase in the number of welded joints leads to impaired corrosion resistance.

An object of the present invention is to provide a fluid control apparatus which can be installed with the number of fittings, number of welds and number of tubes decreased, at a lower cost and with diminished fluid retaining portions (reduced dead volume) that would lower the purity of fluid and which is less susceptible to the problems of impaired corrosion resistance and contamination of fluid due to welding.

SUMMARY OF THE INVENTION

The present invention provides a fluid control apparatus which has a regulator for regulating a flow rate or pressure, and a valve device disposed on at least one of an inlet side and an outlet side of the regulator and comprising a plurality of valves for selectively causing one of a plurality of fluid channels to communicate with a fluid channel of the regulator upon a change-over, the apparatus being characterized in that the valves of the valve device are positioned one upon another.

Preferably, the regulator is provided with an upper connector having a downwardly open channel in communication with the regulator, and a connection member is provided with a lower connector having an upwardly open channel in communication with the connection member, the upper connector being disposed on, and removably joined to, the lower connector so as to cause the downwardly open channel to communicate with the upwardly open channel. The regulator can then be removed singly by separating the upper connector from the lower connector. Accordingly, the regulator can be readily repalced if malfunctioning, and the apparatus can be maintained with an improved efficiency.

When a plurality of fluid control apparatus are arranged side by side, the valves of the apparatus at the same level are connected to each other by a fitting and tube. The connecting tubes used are then positioned at different levels for the valves at differnt levels and are therefore unlikely to interfere with one another. This eliminates the need for the fittings and tubes for avoiding interference between the connecting tubes, reducing the number of fittings and tubes required. The number of welds consequently decreases to result in a cost reduction. With a reduced number of fittings and tubes present, the number of fluid retaining portions also decreases (reduced dead volume) that would lower the purity of fluid, while a decrese in the number of welds lessens the problem of impaired corrosion and contamination of fluid due to welding.

DESCRIPION OF THE PREFERRED EMBODIMENTS

Figure 1:
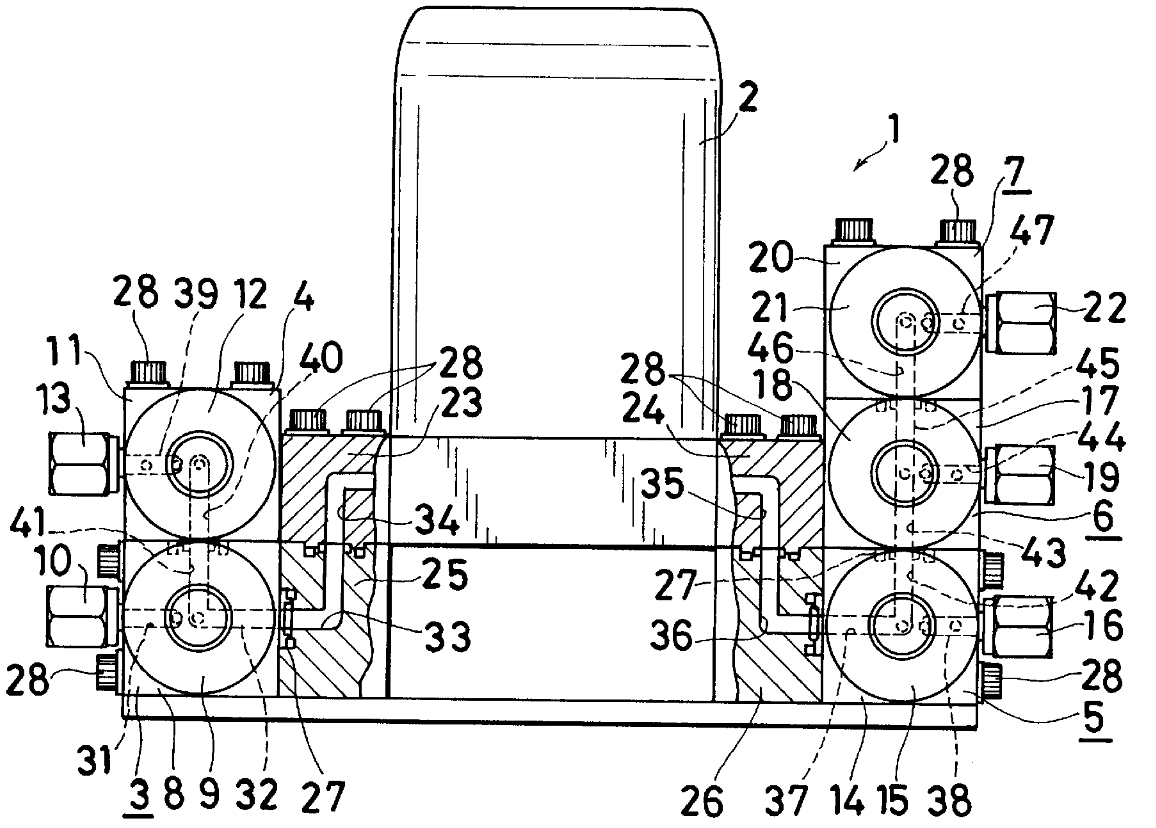
FIG. 1 is a side elevation partly broken away and showing a fluid control apparatus embodying the invention.

Embodiments of the invention will be described below with reference to the drawings. In the following description, the terms "front," "rear," "right"and "left" are used with respect to the direction of flow of fluids; the right-hand side of FIG. 1 will be referred to as "front," the left-hand side thereof as "rear," the rear side of plane of the drawing as "left" and the front side thereof as"right." The terms "upper-"and "lower" are used based on FIG. 1.

Figure 2:
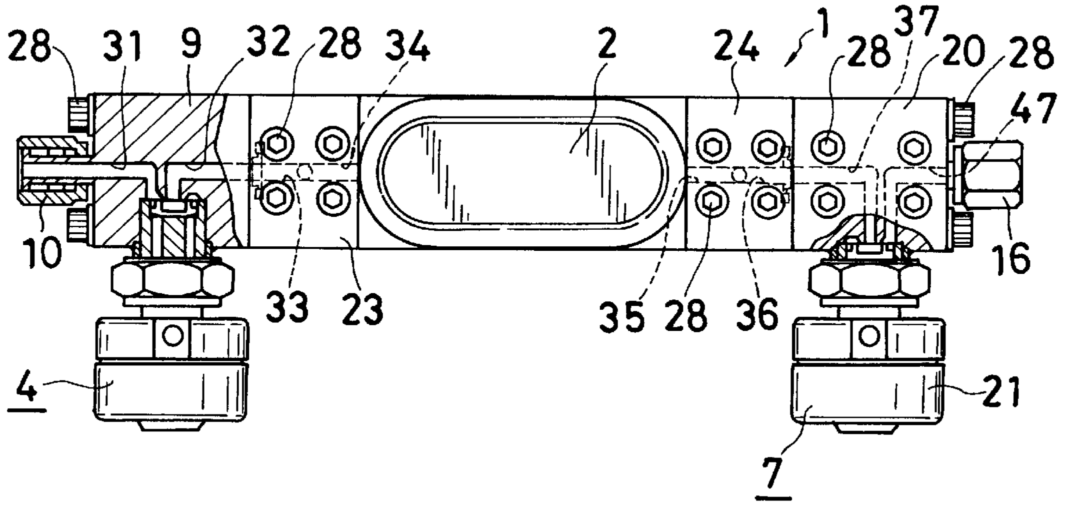
FIG. 2 is a plan view partly broken away and showing the same.
Figure 3:
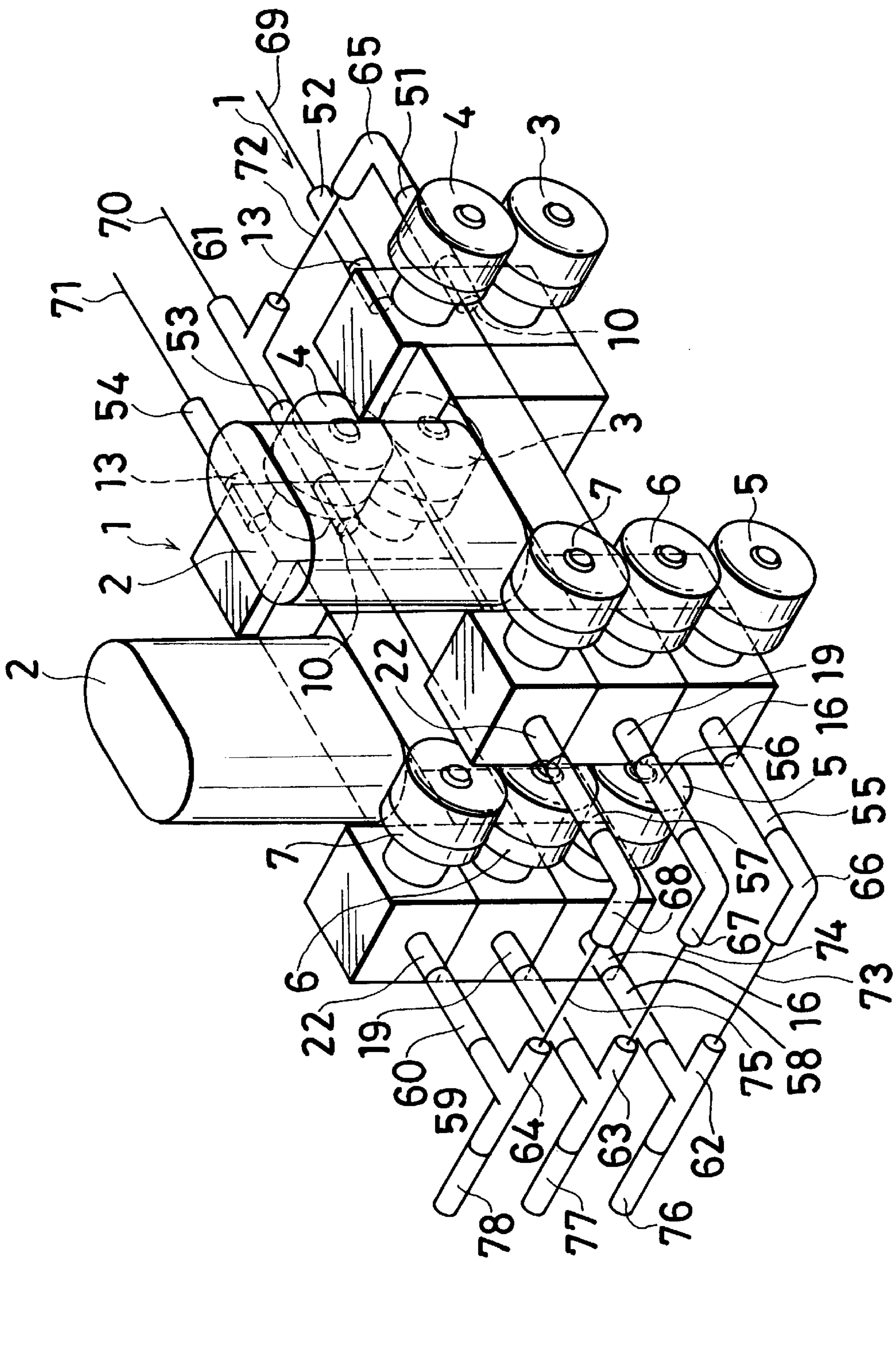
FIG. 3 is a perspective view showing two fluid control apparatus of the invention as arranged side by side and connected together.

FIGS. 1 and 2 show a fluid control apparatus 1 of the invention, and FIG. 3 shows two fluid control apparatus 1 as arranged side by side in the right-left direction.

With reference to FIGS. 1 and 2, the flow control apparatus 1 of the invention comprises a regulator (mass flow controller) 2, and on-off valves 3, 4 and on-off valves 5, 6, 7 arranged respectively on the inlet side (rear side) and the outlet side (front side) of the regulator. The apparatus has five on-off values 3 to 7. Provided at the inlet side are a purge fluid on-off valve 3 and a main fluid on-off valve 4 placed on the valve 3. Arranged at the outlet side are three valves, i.e., a vacuum suction on-off valve 5, a vent on-off valve 6 placed thereon, and a main passage on-off valve 7 placed on the valve 6.

The purge fluid on-off valve 3, which serves to open and close an inlet channel for a purge gas, comprises a rectangular parallelepipedal body 8 having a rearwardly open inlet channel 31, a forwardly open outlet channel 32 and an upwardly open bypass channel 41 communicating with the outlet channel 32, and an actuator 9 for opening and closing the outlet channel 32. The open end of the inlet channel 31 has a sleeve-connecting internally threaded portion 10.

The main fluid on-off valve 4, which serves to open and close an inlet channel for process gas, comprises a rectangular parallelepipedal body 11 having a rearwardly open inlet channel 39 and a downwardly open outlet channel 40 in communication with the bypass channel 41 of the purge fluid on-off valve 3, and an actuator 12 for opening and closing the outlet channel 40. The open end of the inlet channel 39 has a sleeve-connecting internally threaded portion 13.

The vacuum suction on-off valve 5, which serves to open and close a channel communicating with a vacuum pump, comprises a rectangular parallelepipedal body 14 having a rearwardly open inlet channel 37, a forwardly open outlet channel 38 and an upwardly open bypass channel 42 communicating with the inlet channel 37, and an actuator 15 for opening and closing the inlet channel 37. The open end of the outlet channel 38 has a sleeve-connecting internally threaded portion 16.

The vent on-off valve 6, which serves to open and close an outlet channel for the purge gas, comprises a rectangular parallelepipedal body 17 having a forwardly open outlet channel 44, a downwardly open inlet channel 43 communicating with the bypass channel 42 of the vacuum suction on-off valve 5 and an upwardly open bypass channel 45 in communication with this inlet channel 43, and an actuator 18 for opening and closing the inlet channel 43. The open end of the outlet channel 44 has a sleeve-connecting internally threaded portion 19.

The main passage on-off valve 7, which serves to open and close a channel extending to a process chamber, comprises a rectangular parallelepipedal body 20 having a forwardly open channel 47 and a downwardly open inlet channel 46 in communication with the bypass channel 45 of the vent on-off valve 6, and an actuator 21 for opening and closing the inlet channel 46. The open end of the outlet channel 47 has a sleeve-connecting internally threaded portion 22.

The regulator 2 is provided at the front and rear sides of its lower end portion with front and rear upper channel blocks 24, 23 as projected forward and rearward. The rear upper channel block 23 is formed with a downwardly open inlet channel 34 in communication with a rearwardly open inlet channel of the regulator 2. The front upper channel block 24 has a downwardly open outlet channel 35 communicating with a forwardly open outlet channel of the regulator 2. Front and rear lower channel blocks 26, 25 are provided beneath the front and rear upper channel blocks 24, 23, respectively. The front face of the body 8 of the purge fluid on-off valve 3 is in contact with the rear face of the rear lower channel block 25, and the rear face of body 14 of the vacuum suction on-off valve 5 with the front face of the front lower channel block 26. The rear lower channel block 25 has an inlet channel 33 for causing the outlet channel 32 of the purge fluid on-off valve 3 to communicate with the inlet channel 34 of the rear upper channel block 23 therethrough. The front lower channel block 26 is formed with an outlet channel 36 communicating with the outlet channel 35 of the front upper channel block 24 and with the inlet channel 37 of the vacuum suction on-off valve 5.

The body 8 of the purge fluid on-off valve 3 is connected to the rear lower channel block 25 with screws 28 driven into the body 8 of the valve 3 from the rear. The front and rear upper channel blocks 24, 23 are connected respectively to the front and rear lower channel blocks 26, 25 with screws 28 driven into the locks 24, 23 from above. A seal portion 27 is provided at the joint between each pair of members connected together. The front and rear upper channel blocks 24, 23 are fixed to the regulator 2 with screws driven in sideways although not shown. The on-off valves 3, 4 at the inlet side are connected to each other, and the on-off valves 5, 6, 7 at the outlet side are connected to one another, with screws driven in from above, with the actuators 9, 12, 15, 18, 21 directed leftward, the bodies 8, 11, as well as the bodies 14, 17, 20, being placed one upon another.

Thus, the fluid control apparatus has an inlet valve device provided at the inlet side of the regulator 2 and comprising the two on-off valves 3, 4 for selectively causing one of the inlet channels 31, 39 to communicate with the inlet channel of the regulator 2 upon a change-over, and an outlet valve device disposed at the outlet side of the regulator and comprising the three on-off valves 5, 6, 7 for selectively causing one of the outlet channels 38, 44, 47 to communicate with the outlet channel of the regulator 2 upon a change-over, such that a fluid flowing into one of the inlet channels 31, 39 at the inlet side of the apparatus 1 is passed through the regulator 2 and caused to flow out of one of the outlet channels 38, 44, 47 at the outlet side of the apparatus.

With the fluid control apparatus described, the regulator 2 or the main fluid on-off valve 4, if malfunctioning, is singly removable upward for replacement. If the main passage on-off valve 7 or the vent on-off valve 6 malfunctions, these valves are removable upward together for replacement.

With the apparatus described, the front and rear upper channel blocks 24 23 may be incorporated into the regulator 2, while the front and rear lower channel blocks 26, 25 may be made integral with the bodies 8, 14 of the on-off valves 3, 5, respectively. Furthermore, the on-off valves 3, 5 may be attached directly to the regulator 2 with the upper and lower channels blocks 24, 23, 26, 25 omitted. Although the on-off valve 3 in the lower position of the inlet side is used for the purge fluid, and the upper on-off valve 4 for the main fluid according to the embodiment described, the valves 3, 4 may be reversed with respect to these uses without any problem. Similarly, the on-off valves 5, 6, 7 may each serve for vacuum suction, venting or main passage. The foregoing embodiment has no portion wherein a gas remains to impair the purity of the process gas when the process gas is passed through the apparatus, and therefore has the advantage of maintaining the process at a high purity.

Figures 4A, 4B, 4C, 4D, 4E:
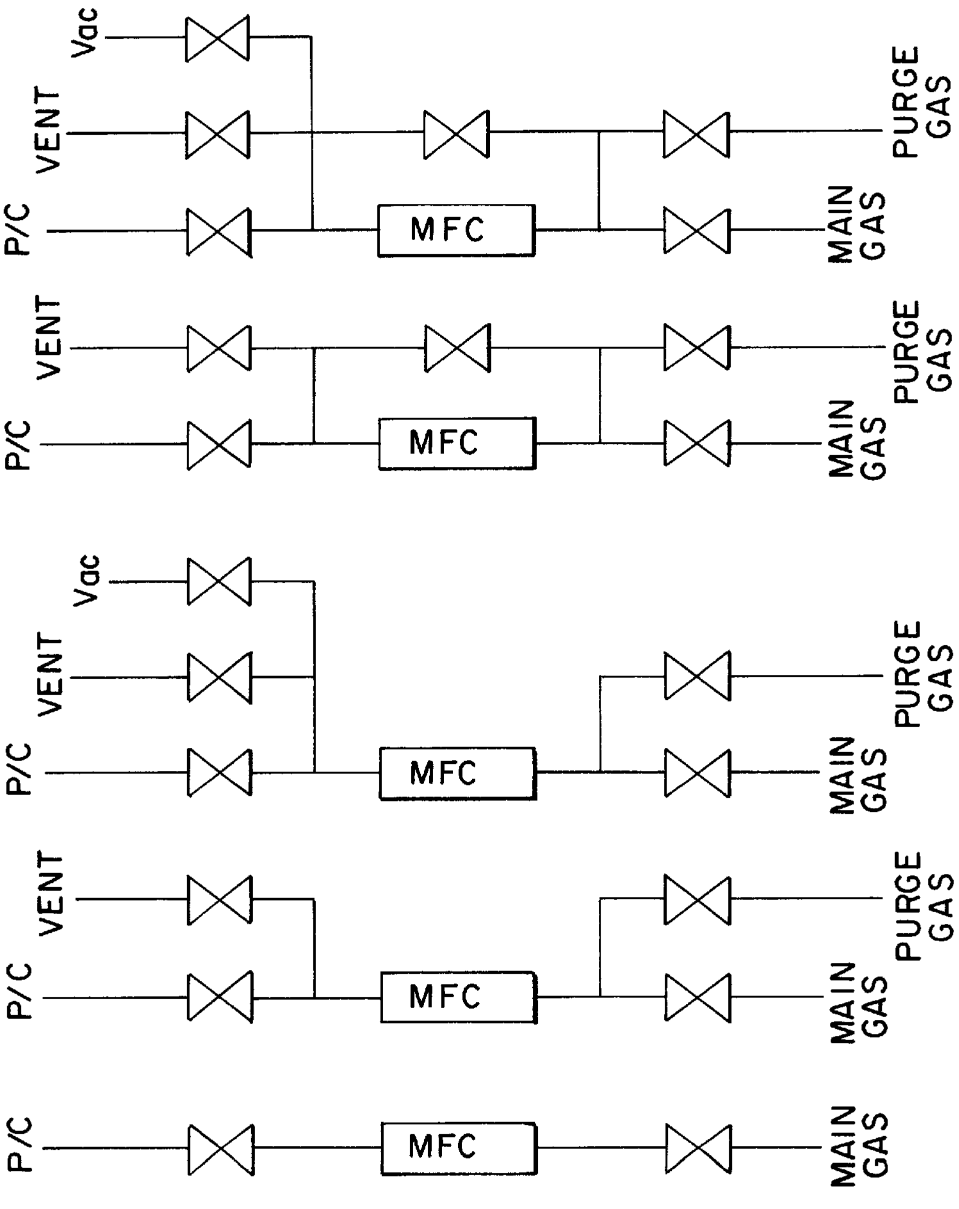
FIG. 4 is a diagram showing five patterns of fluid flow.
Figure 5:
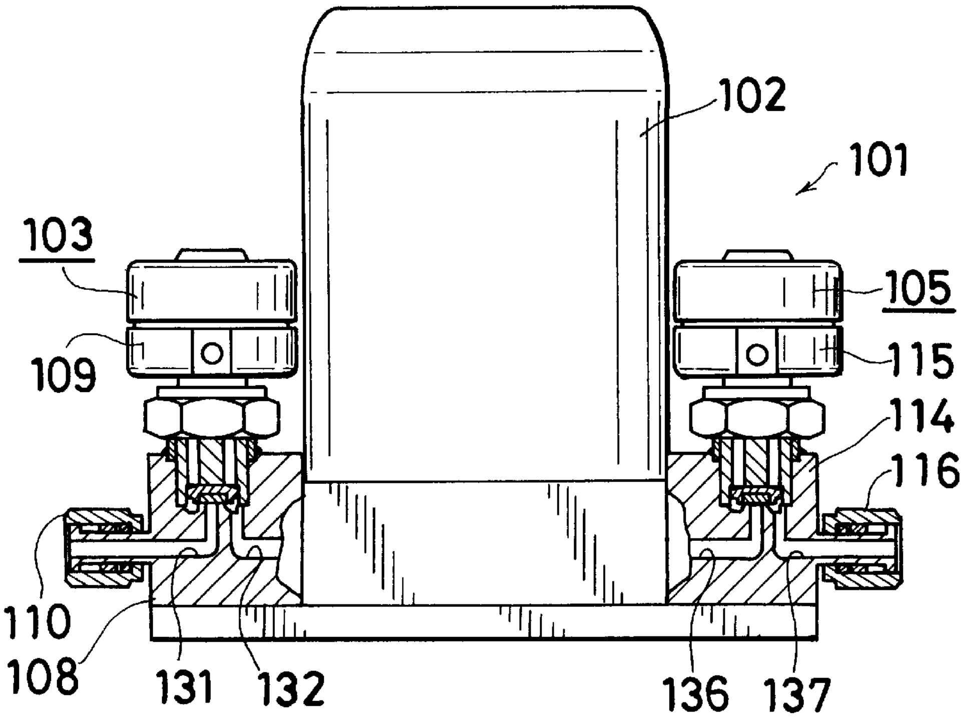
FIG. 5 PRIOR ART
FIG. 5 is a side elevation partly broken away and showing a conventinal fluid control apparatus.
Figure 6:
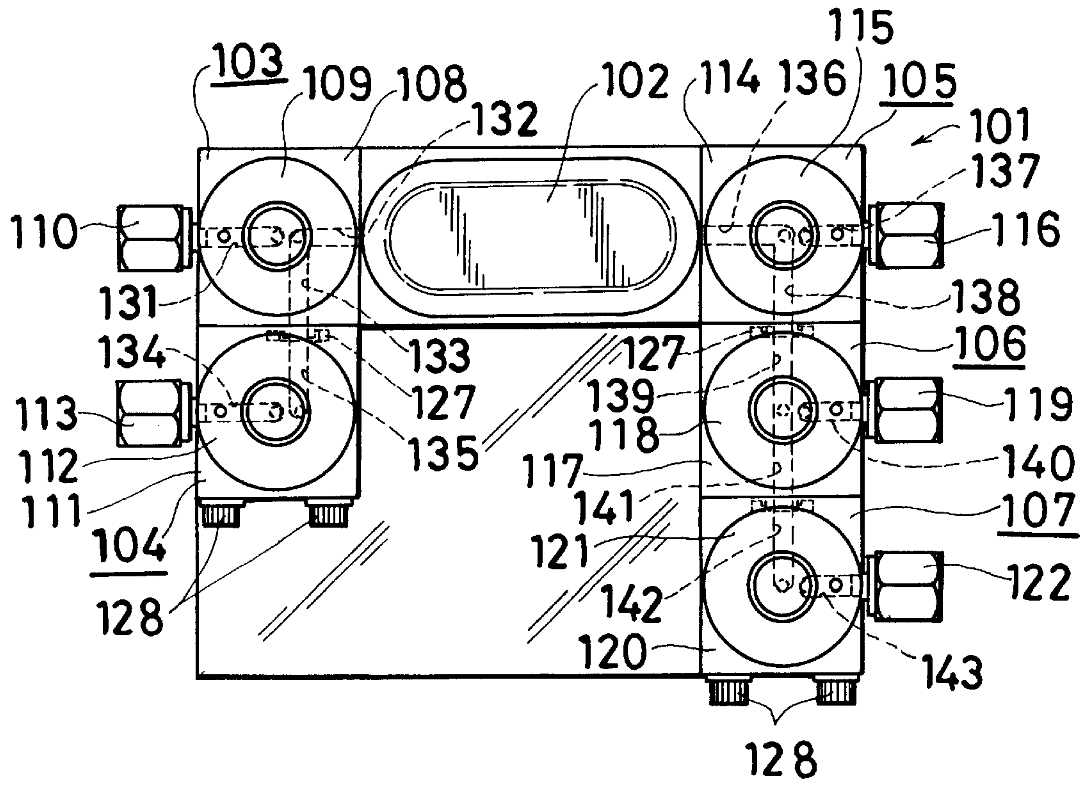
FIG. 6 PRIOR ART
FIG. 6 is a plan view partly broken away and showing the same.

FIG. 4 shows patterns of fluid flow through a mass controller (MFC). FIG. 4 (*a*) shows a pattern wherein a main fluid on-off valve is disposed at the inlet side of the mass flow controller, with a main passage (P/C) on-off valve provided at the outlet side thereof. This pattern is the simplest. FIG. 4(*b*) shows a pattern wherein a main fluid on-off valve and a purge fluid on-off valve are arranged at the inlet side of the mass flow controller, and a main passage on-off valve and a vent on-off valve at the outlet side thereof. With the pattern of FIG. 4(*c*), a main fluid on-off valve and a purge fluid on-off valve are arranged at the inlet side of the mass flow controller, and a main passage on-off valve, vent on-off valve and vacuum suction (Vac) on-off valve at the outlet side of the controller. With the pattern of FIG. 4(*d*), a main fluid on-off valve and a purge fluid on-off valve are arranged at the inlet side of the mass flow controller, a main passage on-off valve and a vent on-off valve are arranged at the outlet side of the mass flow controller, and a channel change-over on-off valve is disposed between the inlet-side valves and the outlet-side valves. The pattern of FIG. 4(*e*) comprises a main fluid on-off valve and a purge fluid on-off valve disposed at the inlet side of the mass controller, a main passage on-off valve, vent on-off valve and vacuum suction on-off valve disposed at the outlet side thereof, and a channel change-over on-off valve disposed between the valves at the inlet side and those at the outlet side.

The fluid control apparatus described has the pattern of FIG. 4(*c*). An apparatus of the pattern of FIG. 4(*b*) can be obtained merely by making the arrangement at the outlet side of the apparatus 1 identical with the arrangement thereof at the inlet side. Further apparatus of the patterns of FIGS. 4(*d*) and 4(*e*) can be obtained by adding a channel change-over on-off valve to the patterns of FIGS. 4 (*b*) and 4 (*c*), respectively. The five patterns shown in FIG. 4 are almost almost all patterns of fluid flow through fluid control systems. The desired control system is obtained by selecting the most suitable of these patterns in which the fluid is replaced or supplied reliably and which is advantageous for the process for fabricating semiconductors, or by using such suitable patterns in combination. The fluid control apparatus 1 described is usable for the four patterns of the five patterns other than (a). While the mass flow controller is mentioned as an example of regulator 2 of the above embodiment, other regulators, such as pressure regulator, are also useful. Suitable regulators are used in combination in constructing fluid conrol apparatus.

In the case where two fluid control apparatus of the type described are installed, the two apparatus are arranged side by side as shown in FIG. 3, and corresponding valves of the adjacent apparatus 1 are connected together by means of fittings and tubes. Thus, connected to each other are the purge fluid on-off valves 3, vacuum suction on-off valves 5, vent on-off valves 6 and main passage on-off valves 7. The main fluid on-iff valves 4, 4 of the respective control apparatus 1 are not connected to each other. The valves 4, 4 have respective sleeves 52, 54 joined to their internally threaded portions 13, 13, and process gas supply tubes 69, 71 are individually joined to the sleeves 52, 54.

The purge fluid on-off valves 3 are connected to each other in the following manner. A sleeve 51 is joined to the internally threaded portion 10 of the valve 3 of the control apparatus 1 at left. A horizontal L-fitting 65 is joined to the sleeve 51. A sleeve 53 is joined to the internally threaded portion 10 of the valve 3 of the apparatus 1 at right, and has joined thereto a horizontal T-fitting 61 with one end joined to a purge gas supply tube 70. The T-fitting 61 is connected to the L-fitting 65 by a tube 72 extending laterally.

The pair of corresponding valves are connected together in the same manner in the case of the vacuum suction on-off valves 5, vent on-off valves 6 and main passage on-off valves 7 at the outlet side. A sleeve 55 (56, 57) is joined to the internally threaded portion 16 (19, 22) of the valve 5 (6, 7) of the apparatus 1 at left. A horizontal L-fitting 66 (67, 68) is joined to the sleeve 55 (56, 57). A sleeve 58 (59, 60) is joined to the internally threaded portion 16 (19, 22) of the valve 5 (6, 7) of the apparatus 1 at right. A horizontal T-fitting 62 (63, 64) is joined to the sleeve 58 (59, 60). The L-fitting 66 (67, 68) is connected to the left end of the T-fitting 62 (63, 64) by a laterally extending tube 73 (74, 75). The right end of the T-fitting 62 (63, 64) is joined directly to a sleeve-connecting internally threaded member 76 (77, 78).

Figure 7:
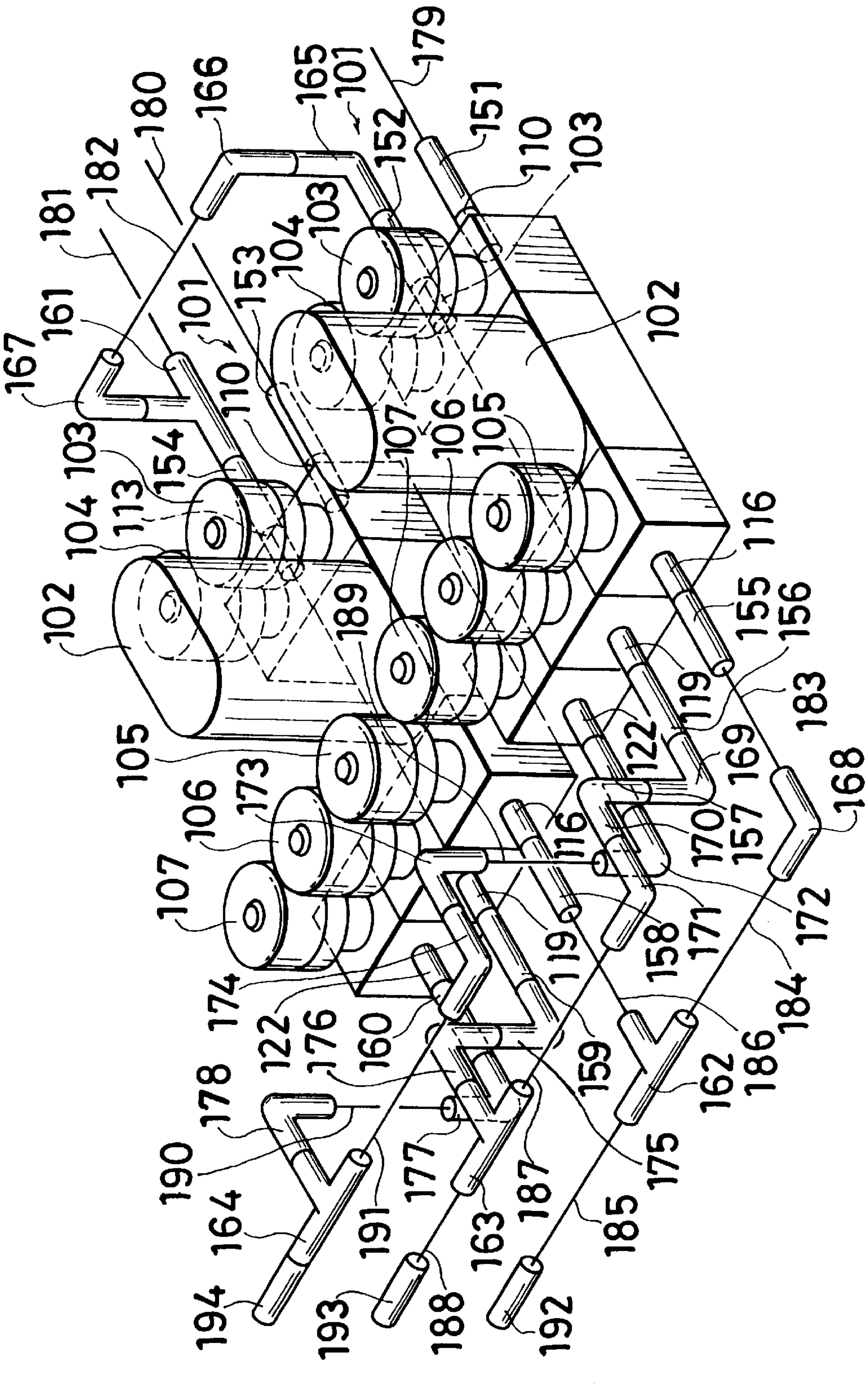
FIG.7 PRIOR ART
FIG. 7 is a perspective view showing two conventional fluid control apparatus as arranged side by side and connected together.

Tables 1 and 2 show the results obtained by comparing the assembly of the invention shown in FIG. 3 with the conventional assembly shown in FIG. 7. Table 1 shows the result obtained for the inlet side where the valves are 2 in number, and Table 2 the result obtained for the outlet side where the valves are 3 in number

TABLE 1

| | | Prior art | Invention |
|---|---|---|---|
| Number of fittings | L-type | 3 | 1 |
| | T-type | 1 | 1 |
| | Sleeves | 4 | 4 |
| Number of welds | | 9 | 7 |
| Number of tubes required | | 4 | 4 |
| Required width | | Reference | Same |

TABLE 2

| | | Prior art | Invention |
|---|---|---|---|
| Number of fittings | L-type | 11 | 3 |
| | T-type | 3 | 3 |
| | Sleeves | 6 | 6 |
| Number of welds | | 29 | 15 |
| Number of tubes required | | 9 | 3 |
| Required width | | Reference | −100 mm |

Table 1 reveals that when the valves are 2 in number, the number of L-fitting is smaller by 2, consequently with the same decrease in the number of welds and with a reduction in volume corresponding to 2 L-fittings, according to the invention. The lateral width corresponds to 2 valve bodies in the prior art, and to the valve body and the actuator in the invention, i.e., a value comparable to that of the former, so that the width remains unchanged.

Table 2 shows that the decreases achieved are 8 in the number of L-fittings, 6 in the number of required tubes which need machining, therefore 14 in the number of welds and a volume reduction corresponding to the decreases in the number of L-fittings and that of tubes. The lateral width of the conventional apparatus 101 corresponds to 3 valve bodies, whereas that of the apparatus 1 of the invention corresponds to the valve body plus the actuator, so that the decrease attained is 50 mm for one apparatus or 100 mm for the assembly. Although not listed in the tables, the front-to-rear length of the assembly of the invention is smaller than the conventional assembly by an amount corresponding to the length of the first and second tubes 183 and 186 used for connecting the main passage on-off valves 105 of the conventional apparatus 101.

The tables and comparison between FIG. 3 and FIG. 7 indicate that the piping system for the fluid control apparatus of the invention is greatly simplified as compared with the conventional system. Consequently, the invention achieves a cost reduction, decreases in the space to be occupied and in the volume of piping, diminution of fluid trapping portions (dead volume) due to the decrease in the volume of piping although such portions lower the purity of the process gas, further lessening the problem of impaired corrosion resistance and contamination of fluid due to the decrease in the number of welds because the problem is attributable to welding. As will be apparent from Tables 1 and 2, the advantages revealed by these tables can be obtained when at least two on-off valves are arranged one upon another at the inlet side or outlet side of the regulator 2.

What is claimed is:

1. A fluid control apparatus, comprising: a regulator for regulating a flow rate or pressure; a valve device disposed on at least one of an inlet side and an outlet side of the regulator, wherein the valve device includes a plurality of valves for selectively causing one of a plurality of fluid channels to communicate with a fluid channel of the regulator upon a change-over, wherein the valves of the valve device are positioned one upon another, wherein the regulator includes an upper connector having a downwardly open channel in communication with the regulator; and a connection member including a lower connector having an upwardly open channel in communication with the connection member, the upper connector being disposed on, and removably joined to, the lower connector so as to cause the downwardly open channel to communicate with the upwardly open channel.

2. A fluid control system characterized in that a plurality of fluid control apparatus as defined in claim 1 are arranged side by side, and the valves of the fluid control apparatus at the same level are connected together by a joint and a tube.

* * * * *